United States Patent [19]

Sasaki

[11] Patent Number: 5,729,778
[45] Date of Patent: Mar. 17, 1998

[54] MAGNETIC RECORDING METHOD AND DEVICE FOR MAGNETIC RECORDING BINARY CODE DATA ON PHOTO FILM

[75] Inventor: Wataru Sasaki, Saitama, Japan

[73] Assignees: Fuji Photo Film Co., Ltd., Kanagawa; Fuji Photo Optical Co., Ltd., Saitama, both of Japan

[21] Appl. No.: 653,275

[22] Filed: May 24, 1996

[30] Foreign Application Priority Data

May 26, 1995 [JP] Japan .................. 7-128234
May 26, 1995 [JP] Japan .................. 7-128235

[51] Int. Cl.$^6$ ........................... G03B 17/24
[52] U.S. Cl. ............................... 396/319
[58] Field of Search ................. 354/105, 106; 396/310, 311, 319

[56] References Cited

U.S. PATENT DOCUMENTS

| | | | |
|---|---|---|---|
| 3,904,283 | 9/1975 | Arai | 352/72 |
| 4,622,599 | 11/1986 | Norton, Jr. | 360/31 |
| 5,335,029 | 8/1994 | Itoh et al. | 354/106 |
| 5,344,730 | 9/1994 | Kitamoto et al. | 430/14 |
| 5,347,403 | 9/1994 | Uekusa | 360/3 |
| 5,422,694 | 6/1995 | Yoshida et al. | 354/106 |
| 5,434,634 | 7/1995 | Yoshida | 354/106 |
| 5,453,805 | 9/1995 | Itoh | 354/106 |
| 5,555,047 | 9/1996 | Tsuji et al. | 354/106 |

OTHER PUBLICATIONS

Understanding Data Communications, 2nd edition. By: George E Friend et al. pp. 176–181, 1989.
Communication Systems by A. Bruce Carlson p. 10, 1986.

Primary Examiner—Safet Metjahic
Assistant Examiner—Christopher E. Mahoney
Attorney, Agent, or Firm—Sughrue, Mion, Zinn, Macpeak & Seas, PLLC

[57] ABSTRACT

A magnetic recording method or device for recording binary code data on a magnetic recording track of photo film while moving the photo film in a direction on a magnetic head. Each bit of the binary code data is recorded as a bit segment of a constant length constituted of a forward magnetic zone magnetized in a forward direction identical to a film advance direction, and a reversed magnetic zone magnetized in reverse to the forward direction and disposed behind the forward magnetic zone. The forward magnetic zone has one of two different lengths within each bit segment depending upon binary value of the bit segment. An additional reversed magnetic zone is recorded immediately before a start bit segment of the binary code data, for a time period which is determined for recording the forward magnetic zone of the start bit segment. An additional forward magnetic zone is recorded immediately after an end bit segment of the binary code data, for a time period which is used for recording the reversed magnetic zone of the end bit segment. As a result of this, the first and last bits of data are more reliably generated.

28 Claims, 12 Drawing Sheets

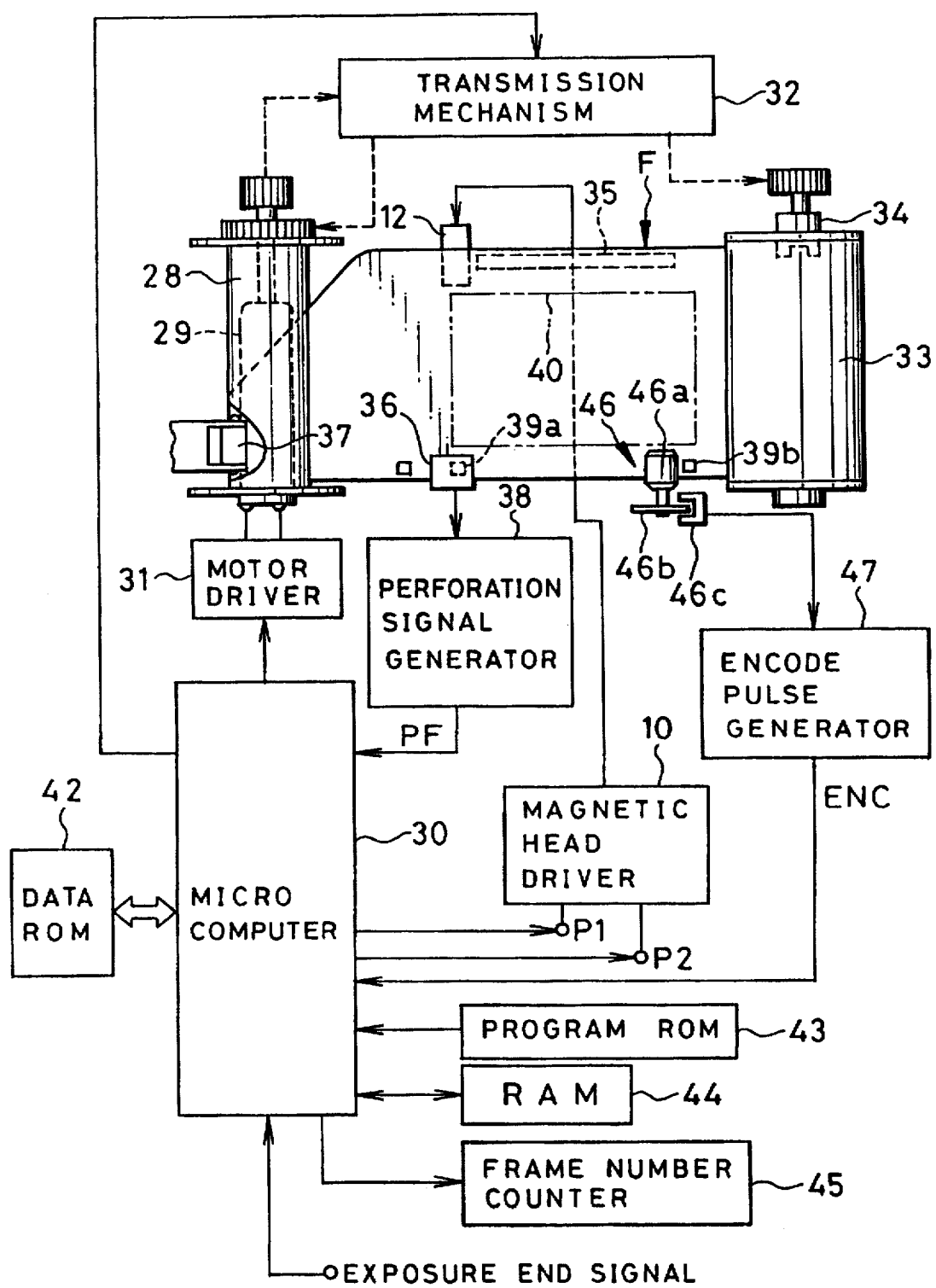

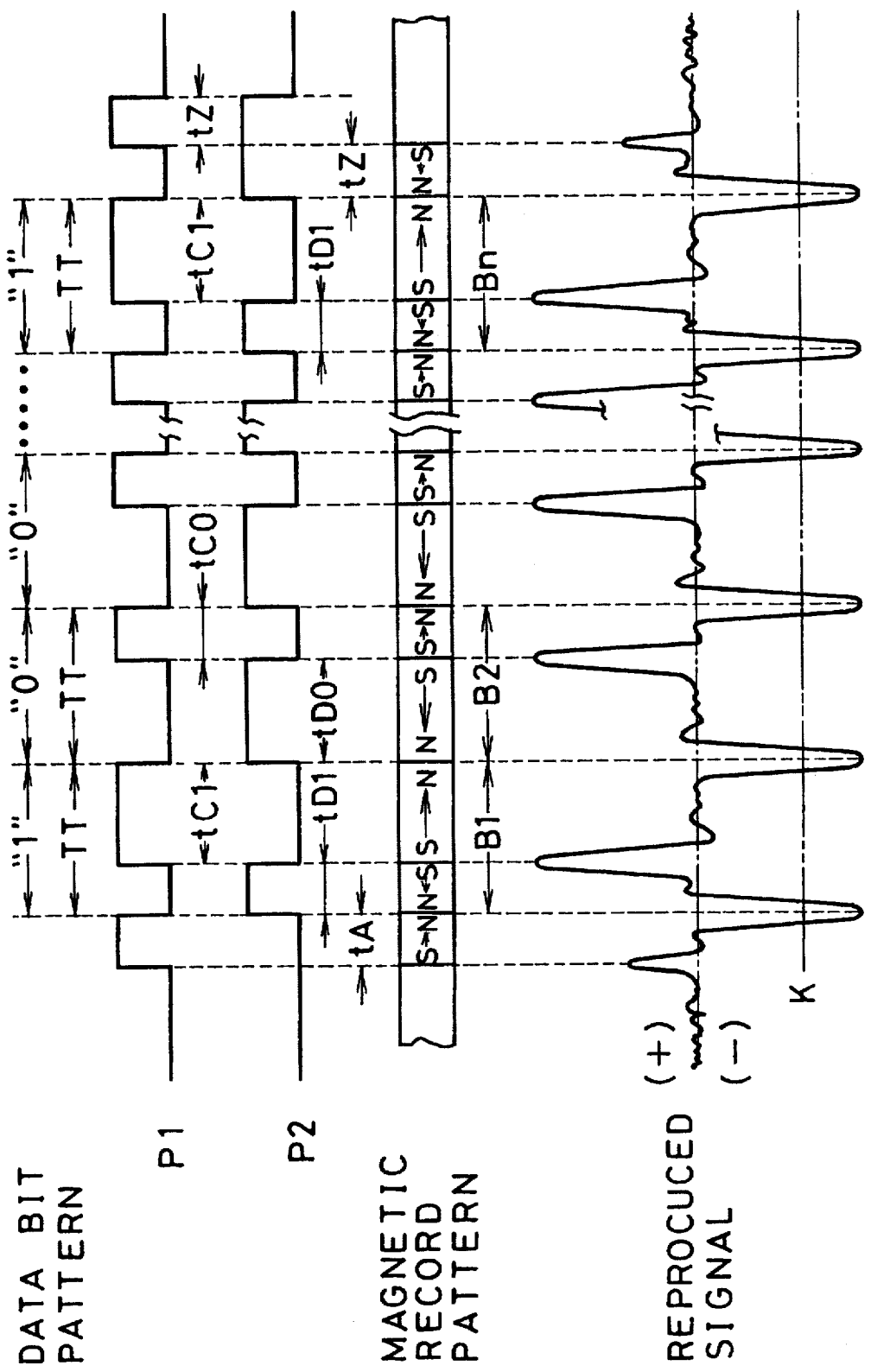

MAGNETIC RECORDING METHOD AND DEVICE FOR MAGNETIC RECORDING BINARY CODE DATA ON PHOTO FILM

BACKGROUND OF THE INVENTION

1. Field of the Invention

The present invention relates to a magnetic recording method and a magnetic recording device therefor. More particularly, the invention relates to a magnetic recording method and a magnetic recording device in which binary code data is recorded on a photo film while the film is advanced frame by frame.

2. Description of the Related Art

A recording device is known which records on a photo film photographic information such as a shutter speed and an aperture value, as well as print information such as print number and trimming range and so forth. The recorded information is read during a photofinishing process at a laboratory to control the print exposure or the print format. It has also been suggested to provide a magnetic recording layer on a photo film and record information on the magnetic recording layer by use of a magnetic head incorporated in a camera while the photo film is advanced by one frame after each exposure, or by use of a magnetic recording device installed in a photo-shop or a photofinishing lab.

Because of a larger stiffness than ordinary magnetic tapes, the photo filmstrip can be easy to curl. Therefore, the magnetic head for use in recording on the photo filmstrip should be able to keep stable contact with the filmstrip. In addition, as magnetic materials for the magnetic recording layer on the photo film cannot be provided with a high density, it is preferable in view of noise reduction to record the information in a digital fashion, i.e., as binary code data.

FIG. 8 shows an example of magnetic head driver for the digital recording. The magnetic head driver is supplied with a power source voltage VBB. In a case where the magnetic head driver is incorporated in a camera, a lithium cell with a supply voltage of about 3 V, which originally serves as a main power source of the camera, supplies the power source voltage VBB. A magnetic head 12 is driven through switching transistors 13, 14, 15 and 16 which are connected as a bridge circuit, and control transistors 17 and 18 are connected to ON-OFF control the switching transistors 13 to 15. The control transistors 17 and 18 are turned ON in response to a switching signal applied to a first port P1 and a second port P2, respectively. Hereinafter, the switching signal applied to the first port P1 will be referred to as a first pulse signal, whereas the switching signal applied to the second port P2 will be referred to as a second pulse signal.

On the magnetic recording, when the first port P1 is set at a low level, and the second port P2 is set at a high level, the control transistor 17 is turned OFF and the control transistor 18 is turned ON, so that the switching transistors 13 and 16 are turned OFF, and the switching transistors 14 and 15 are turned ON. In result, current IH flows through a coil 12a of the magnetic head 12 in a direction shown by an arrow in FIG. 8. At that time, the magnetic head 12 generates a magnetic field in a forward direction that can be designed to correspond with a film advance direction. In this case, a zone magnetized in the film advance direction, hereinafter referred to as a forward magnetic zone, is recorded on the magnetic recording layer of the photo film.

On the other hand, when the first port P1 is set at the high level, and the second port P2 is set at the low level, the control transistor 17 is turned ON and the control transistor 18 is turned OFF, so that the switching transistors 13 and 16 are turned ON, and the switching transistors 14 and 15 are turned OFF. In result, the current IH through the coil 12a of the magnetic head 12 flows in the opposite direction to that shown by the arrow in FIG. 8. At that time, the magnetic field generated from the magnetic head 12 is directed in a reversed direction that is reverse to the film advance direction in this instance. Then, a zone magnetized in the reversed direction to the forward magnetic zone, hereinafter referred to as a reversed magnetic zone, is recorded on the magnetic recording layer of the photo film.

Diodes 20, 21, 22 and 23, which are respectively connected in parallel to the switching transistors 13 to 14, function as flywheel diodes for preventing fluctuation of the current IH that can be caused by an inverted electromotive power generated at the moment when the current IH changes the direction. A capacitor 24, which is connected in parallel to the coil 12a, is a bypass capacitor for preventing a high-frequency noise on the current IH.

Resistances 25 and 26, which are connected in series between the switching transistor 13 and 14, on one hand, and the coil 12a, on the other hand, function as constant resistances for regulating the magnitude of the current IH. The resistances 25 and 26 have a value at least several times as large as the impedance of the coil 12a, so that affection of the inductance component of the coil 12a on the current IH is reduced to a minimum. This is effective for maintaining the current IH stable.

FIG. 9 shows an example of conventional magnetic recording of binary code data. Each bit of the binary code data is recorded as a bit segment having a constant length in the longitudinal direction of a magnetic recording track. Each bit segment is constituted of a forward magnetic zone and a succeeding reversed magnetic zone. An analog signal reproduced from the recorded magnetic pattern has a positive curve for the forward magnetic zone, and a negative curve for the reversed magnetic zone, so that a positive peak is generated when the magnetizing direction is changed to the reverse, and a negative peak is generated when the magnetizing direction is changed to the forward.

A negative peak having an amplitude larger than a threshold value K is regarded as a clock signal. And a positive peak generated between two adjacent clock signals is regarded as a data signal. Whether the data signal represents binary "1" or "0" is discriminated according to the position of the data signal relative to the two adjacent clock signals. In this example, if the data signal is nearer to the preceding clock signal, the data signal is considered to represent binary "1". If the data signal is nearer to the succeeding clock signal, the data signal is considered to represent binary "0". In other words, the border between the two inverted magnetic zones within the bit segment varies depending upon the binary value.

Accordingly, the second pulse signal applied to the second port P2 has a smaller width tD1 for recording a bit of value "1", and a larger width tD0 for recording a bit of value "0". The first pulse signal applied to the first port P1 has inverted phase, so that the first pulse signal has a larger width tC1 for recording binary "1". For binary "0", the first pulse signal has a smaller width tC0. The sum "tD1+tC1" or "tD0+tC0" represents a time interval TT for recording each bit segment, and corresponds with a spacing between two adjacent clock signals of the reproduced signal.

3. Problems to be solved by the Invention

At the start of magnetic recording, neither the second pulse signal nor the first pulse signal is applied to the first and second ports P1 and P2 of the magnetic head driver, so that the control transistors 17 and 18 and the switching transistors 13 to 16 are all OFF, and thus no current is flowing through the magnetic head 12. Therefore, a not-magnetized zone is disposed before the forward magnetic zone of a start bit segment. As a result, an initial clock signal in the reproduced signal has a smaller amplitude compared with the following clock signals that are generated upon inversion of the magnetizing direction, i.e., transfer from the reversed magnetic zone to the forward magnetic zone. If the amplitude of the initial clock signal does not reach the threshold value K, it is impossible to detect the recording interval TT of the start or first bit segment, and the position of the data signal relative to the adjacent clock signals, so that it is impossible to discriminate the binary value of the start or first bit of the recorded data.

In the end of magnetic recording, if all of the switching transistors 13 to 16 are simultaneously turned OFF, a non-magnetized zone follows an end bit segment, so that the final clock signal generated at the trailing end of the reversed magnetic zone of the end or last bit segment would have a smaller amplitude than the normal clock signals, as shown in FIG. 9. Therefore, the same error as described with respect to the initial clock signal can occur.

Moreover, at the end of magnetic recording, a closed circuit including the magnetic head 12 becomes so unstable that a vibrating current can flow through the coil 12a due to the inductance or the capacitance of the magnetic head driver circuit. If the second port P2 is set to the high level simultaneously with the trailing edge of the second pulse signal for the end or last bit of the recording data, as is shown in FIG. 10, in order to generate the final clock signal with a sufficient amplitude, also the vibrating current would be amplified, results in recording an extraneous magnetic zone behind the reversed magnetic zone of the last bit segment, as is implied by a hatched zone X in FIG. 10. If a negative peak, which can be generated in the reproduced signal due to the extraneous magnetic zone, should have an amplitude larger enough to reach the threshold value K, as shown in FIG. 10, a positive peak between the negative peak and the final clock signal could be mistaken as a data signal.

In order to make the initial and final clock signals have a sufficient amplitude, it is possible to prerecord a reversed magnetic zone having a larger length than each bit segment before the forward magnetic zone of the first bit segment, and rerecord a forward magnetic zone having a larger length than each bit segment behind the reversed magnetic zone of the last bit segment. However, this solution is disadvantageous for use in the camera in view of power consumption, as the camera ordinarily uses a single power source of a limited voltage for supplying all of the electric elements of the camera.

OBJECT OF THE INVENTION

In view of the foregoing, a prime object of the present invention is to provide a magnetic recording method, and a magnetic recording device therefor, by which recorded binary code data can be decoded with accuracy without suffering from noises which may be produced in the reproduced signal at the leading and trailing ends of the recorded data.

Another object of the present invention is to provide a magnetic recording method, and a magnetic recording device therefor, which require low electric power and is suitable for use in a camera.

SUMMARY OF THE INVENTION

To achieve the above and other objects in a magnetic recording method for recording binary code data on a magnetic recording track of photo film while moving the photo film in a direction on a magnetic head, wherein each bit of the binary code data is recorded as a bit segment of a constant length constituted of a first kind of magnetic zone magnetized in a first direction and a second kind of magnetic zone magnetized in reverse to the first direction and disposed behind the first kind of magnetic zone, the first kind of magnetic zone having one of two different lengths within each bit segment depending upon binary value assigned to the bit segment, according to the present invention, an additional magnetic zone of the second kind is recorded immediately before a start bit segment of the binary code data, for a time period determined based on one of the two different lengths of the first kind of magnetic zone.

For example, the first kind of magnetic zone is magnetized in a forward direction equal to a film advance direction.

Also, an additional magnetic zone of the first kind is recorded immediately after an end bit segment of the binary code data, for a time period determined based on one of the two lengths of the first kind of magnetic zone.

According to a preferred embodiment, the time period for recording the additional magnetic zone of the second kind is determined to be equal to a first or a second time period which is selected for recording the first kind of magnetic zone of the start bit segment, and the time period for recording the additional magnetic zone of the first kind is determined to be equal to a first or a second time period which is selected for recording the first kind of magnetic zone of the end bit segment.

Another preferred embodiment of the present invention is provided with the steps of:

A. recording a first kind of magnetic zone magnetized in a first direction by conducting a constant current in a forward direction through the magnetic head for a first or a second time period which is selected depending upon binary value of each bit of the binary code data;

B. recording a second kind of magnetic zone magnetized in reverse to the first direction behind the first kind of magnetic zone by conducting the constant current in a reversed direction through the magnetic head for a time period given by subtracting the first or the second time period from a bit recording interval predetermined for recording one bit;

C. repeating steps A and B from a start bit to an end bit of the binary code data;

D. recording an additional magnetic zone of the second kind immediately before the start bit of the binary code data, by conducting a gradually increasing current through the magnetic head in the reversed direction; and E. recording an additional magnetic zone of the first kind immediately behind the end bit of the binary code data, by conducting a gradually decreasing current through the magnetic head in said forward direction.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 1 is a schematic diagram showing the overall structure of a magnetic recording device according to an embodiment of the present invention;

FIG. 2 is a timing chart illustrating the operation of the magnetic recording device;

DETAILED DESCRIPTION OF THE PREFERRED EMBODIMENTS

Figure 3A:
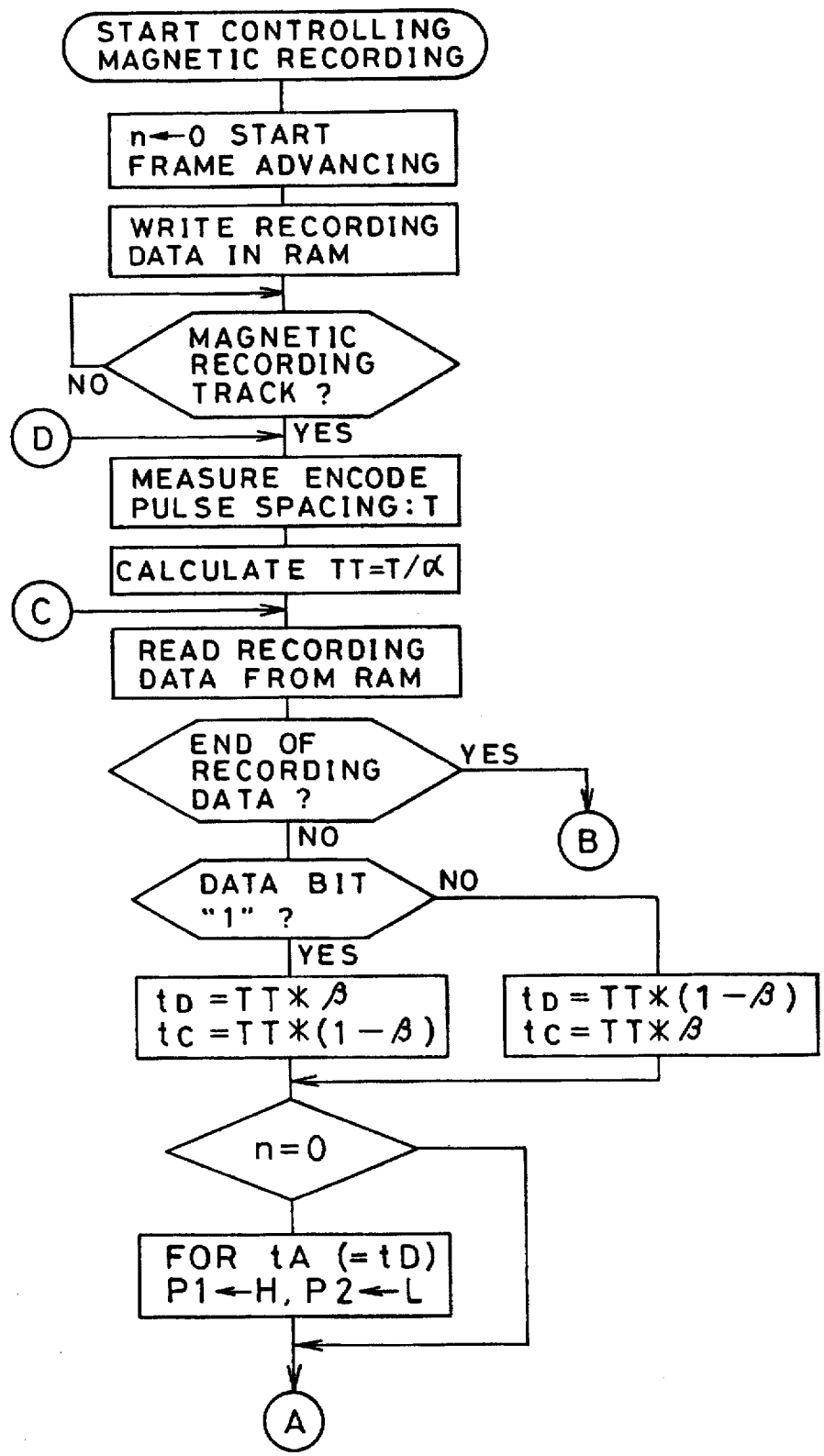
FIGS. 3A and 3B show a flow chart illustrating the operation of the microcomputer of the magnetic recording device.

Referring to FIG. 1 showing the overall structure of a camera having a magnetic recording device according to an embodiment of the invention, a motor 29 is mounted in a take-up spool 28, and driven by a motor driver 31 under the control of a microcomputer 30. Also, a transmission mechanism 32 is controlled by the microcomputer 30 to transmit the power of the motor 29 either to the take-up spool 28 or to a fork 34. When the take-up spool 28 is rotated by the motor 29, a filmstrip F is wound up onto the take-up spool 28. When the fork 34 is rotated by the motor 29, the filmstrip F is rewound into a cassette 33.

The base surface of the filmstrip F is entirely coated with a transparent magnetic recording layer, of which a predetermined area is utilized as a magnetic recording track 35 on which photographic information, such as a shutter speed and an aperture value, is recorded in form of binary code data. The filmstrip F has a pair of perforations 39a and 39b per frame which are arranged along a side edge of the filmstrip to designate a leading end and a trailing end of each frame. The magnetic recording track 35 extends along the opposite side edge of the filmstrip F from the perforations 39a and 39b between the leading and trailing ends of each frame.

A reflection type photosensor 36 is disposed on the passageway of the filmstrip so as to detect the perforations 39a and 39b. Each time the photosensor 36 detects two perforations, the motor 29 stops being driven. Thus the filmstrip F is advanced by one frame at a time. The outer periphery of the take-up spool 28 is wrapped with a rubber sheet, and a roller 37 is in frictional contact with the outer periphery of the take-up spool 28, so that a leading end of the filmstrip F is nipped between the roller 37 and the take-up spool 28, to be wound onto the take-up spool 28.

The photosensor 36 outputs a photoelectric signal to a perforation signal generator 38, which outputs a perforation signal PF to the microcomputer 30. The microcomputer 30 stops driving the motor 29 responsive to every second perforation signal PF, so as to advance the filmstrip F by one frame and position a frame behind an exposure aperture 40 of a camera.

Figure 8:
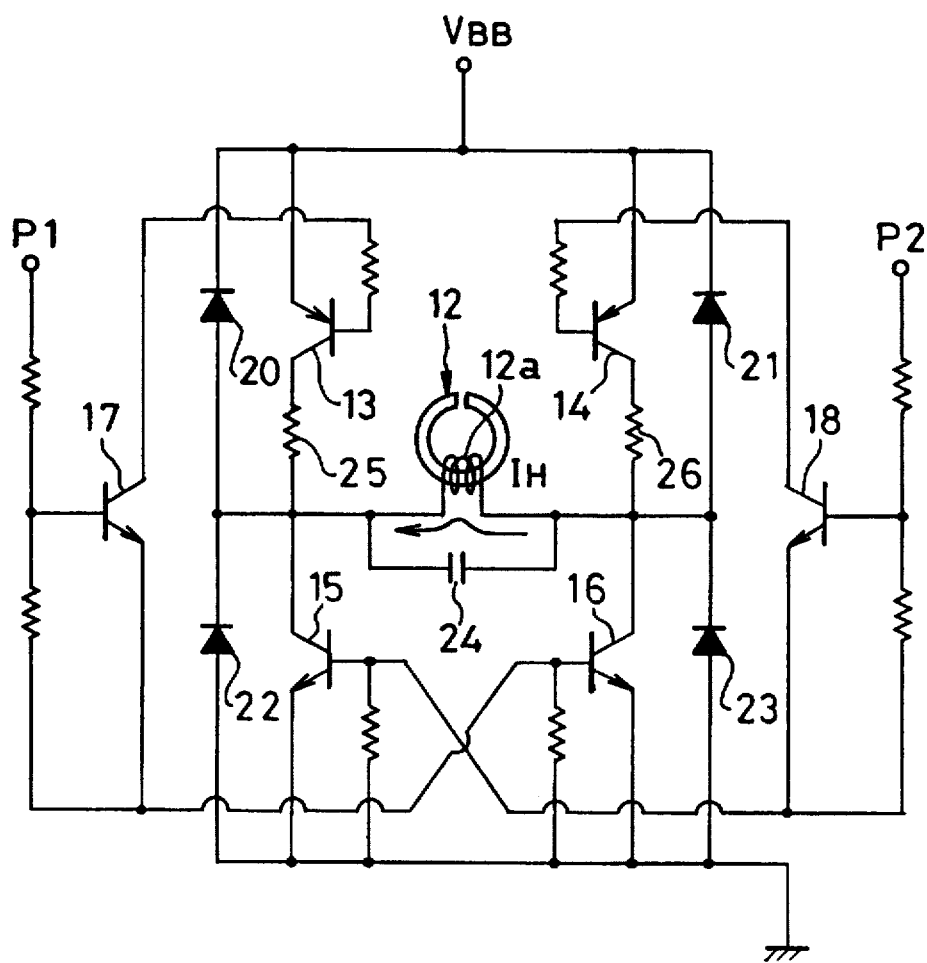
FIG. 8 is a circuit diagram of an example of magnetic head driver.
Figure 9:
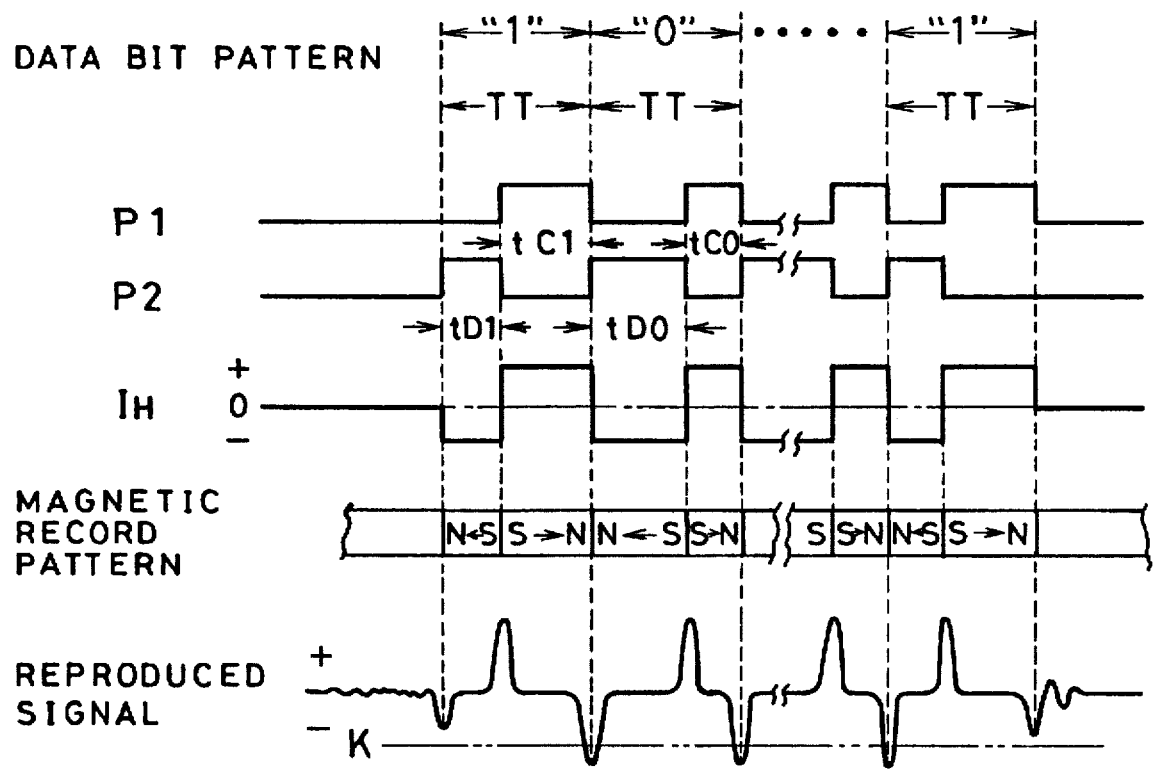
FIG. 9 is a timing chart illustrating a magnetic recording according to a conventional method.

A magnetic head 12 for data recording is disposed in a circumferential position of the exposure aperture 40, on the opposite side from the photosensor 36. The magnetic head 12 is driven by a magnetic head driver 10 during the one-frame advancing of the filmstrip F, to magnetically record the binary code data representing photographic information onto the magnetic recording track 35. The magnetic head driver 10 has the same construction as shown in FIG. 8. Binary code data recordable on the magnetic recording track 35 is previously stored in a data ROM 42, which is connected to the microcomputer 30.

A program ROM 43 stores a control sequence for the motor 29 and the transmission mechanism 32, a sequence program for controlling the magnetic recording, and so forth. The sequence of magnetic recording includes those processes which are specific to the present invention and are executed at the beginning and the end of the recording on each magnetic recording track 35, as set forth later. A RAM 44 is used as a working area for temporarily storing control data necessary for the photographing sequence and the magnetic recording sequence. The RAM 44 is also written with the data to be recorded on the magnetic recording track 35 prior to the magnetic recording. A frame number counter 45 is counted up one by one upon every second perforation signal PF after an initial or first frame of the filmstrip F is positioned behind the exposure aperture 40. The count of the frame number counter 45 represents the number of exposed frames.

An encoder or speed sensor 46 is provided for detecting the advance speed of the filmstrip F. The encoder 46 is constituted of a roller 46a rotated along with the filmstrip F being advanced, an encode plate 46b having a plurality of radial slits and rotating with the roller 46a, and a photosensor 46c. The photosensor 46c detects the slits of the encode plate 46b while the roller 46a and the encode plate 46b rotate, to output an intermittent photoelectric signal to an encode pulse generator 47. The encode pulse generator 47 outputs an encode pulse ENC in response to the intermittent photoelectric signal, that is, each time the filmstrip F is advanced by a unit length. The encode pulse ENC is inputted in the microcomputer 30.

It is possible to couple the same encode plate as the encode plate 46b to a rotary shaft of the motor 29 or a gear driven by the motor 29, to obtain a photoelectric signal which is synchronous with the rotation of the motor 29. However, such a synchronous signal has no bearing on the diameter of the filmstrip F rolled on the take-up spool 28, so that the synchronous signal does not completely represent the advanced length of the filmstrip F. By correcting the synchronous signal with a correction value to take the film roll diameter or the number of exposed frames into account, an encoder pulse could be generated which virtually represents that the filmstrip F is advanced by the unit length.

As shown in FIG. 2, the binary code data representing the photographic information is recorded in series along the magnetic recording track 35 in form of a magnetic pattern. Each bit of the binary code data is recorded as a bit segment B1, B2 ... Bn having a constant length in the longitudinal direction of the magnetic recording track 35. Each bit segment is constituted of a forward magnetic zone and a succeeding reverse magnetic zone, in the same way as conventional. Because the bit segment must have the constant length even when the advance speed of the filmstrip F varies or fluctuates, the encoder pulse ENC is utilized for determine a recording interval TT of each bit segment in accordance with the advance speed of the filmstrip F. It is possible to generate the encoder pulses ENC at a high frequency so as to directly represent the recording interval TT. This configuration would simplify the signal processing, but would require a highly accurate and expensive encoder. Accordingly, the present embodiment calculates the recording interval TT from an encoder pulse spacing T by dividing it by a constant α (a positive integer).

Figure 3B:
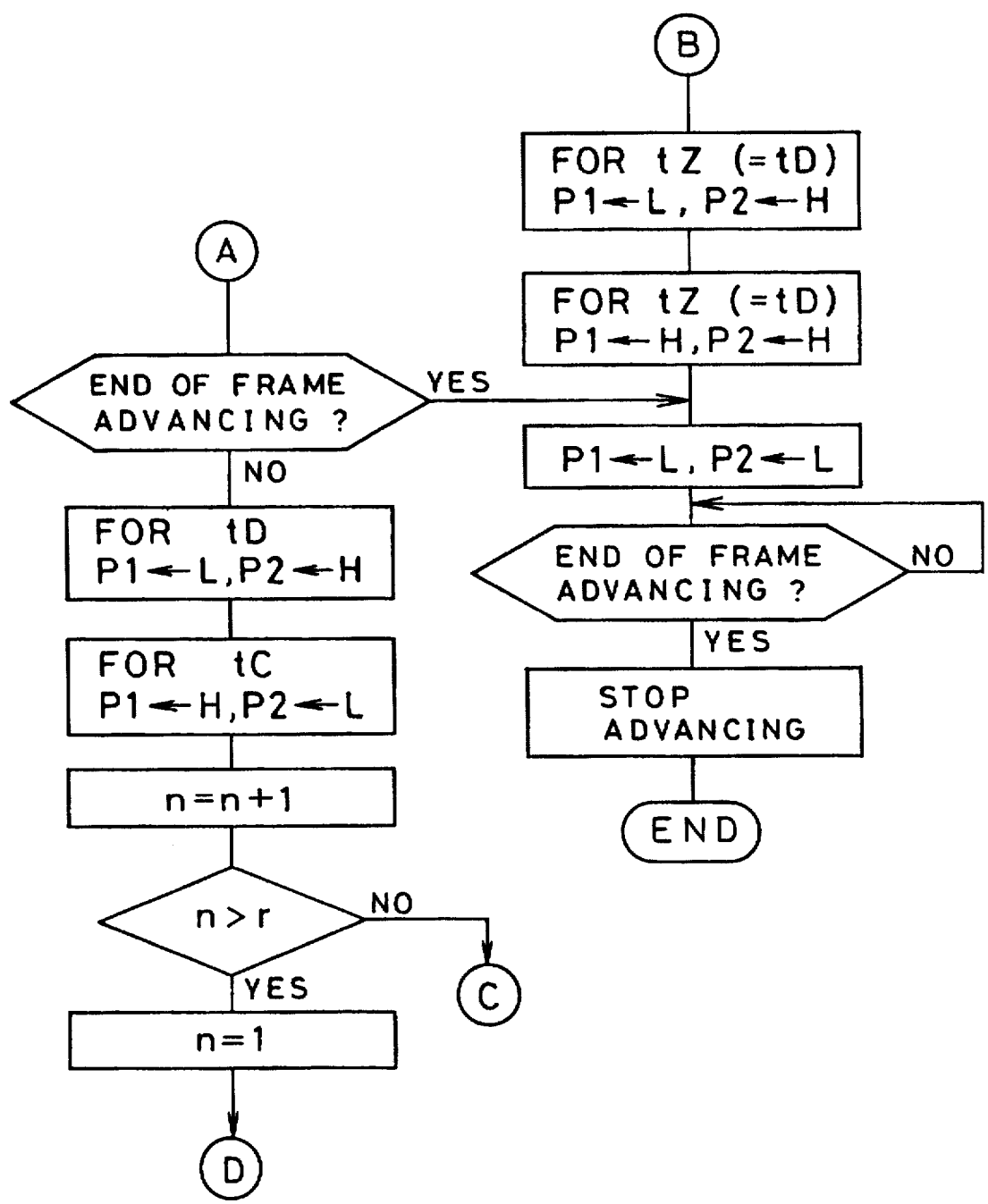

The operation of the above magnetic recording device will now be described with reference to FIGS. 2, 3A and 3B.

At the end of an exposure, an exposure end signal is inputted to the microcomputer 30, which then resets "bit recording number n1" to zero, and starts driving the motor 29 through the motor driver 31 for the one-frame advancing of the filmstrip F. The bit recording number n1 indicates the number of bits having been recorded on the magnetic recording track 35 during the one-frame advancing.

Thereafter the microcomputer 30 refers to the data ROM 42 to convert photographic information about the just exposed frame into binary code data, and write it as recording data in a predetermined address of the RAM 44. Simultaneously with the start of one-frame advancing, the microcomputer 30 begins to receive the encode pulses ENC from the encode pulse generator 47, and counts up the encoder pulses ENC so as to determine if a leading end of the magnetic recording track 35 moves to the magnetic recording head 12.

Each time the filmstrip F has been advanced by a given length, the microcomputer 30 detects an encoder pulse spacing T between the latest encoder pulse ENC and the preceding encoder pulse ENC. The encoder pulse spacing T principally corresponds to the unit length of the filmstrip F, so that the recording interval TT is calculated by dividing the amount T by the constant α. If, for example, eight bits should be recorded in the unit length, the constant α=8.

Then the recording data starts being read serially from the RAM 44, and each bit of the recording data is checked as to whether it is binary "1" or "0". Depending on the binary value of the bit to be recorded at the moment, a pulse width tC of a first pulse signal to be applied to a first port P1 and a pulse width tD of a second pulse signal to be applied to a second port P2 of the magnetic head driver 10 are determined. Specifically, for the binary "1", the pulse width tD is calculated according to an equation tD=TT×β=tD1, whereas the pulse width tC is calculated according to an equation tC=TT×(1−β)=tC1, wherein β is a constant. On the other hand, for the binary "0" the pulse width tD is calculated according to an equation tD=TT×(1−β)=tD0, whereas the pulse width tC is calculated according to an equation tC=TT×β=tC0.

The constant β should be other than 0.5, and preferably 0.2 to 0.4, because the discrimination between binary "1" and "0", that is, binary value of each bit of the binary code data recorded as a bit segment on the magnetic recording track 35 is represented by the position of a positive peak of a reproduced signal within the recording interval TT between two adjacent negative peaks of the reproduced signal, as set forth above with respect to the conventional method. Hereinafter, the positive peak and the negative peak of the reproduced signal will be referred to as a data signal and a clock signal, respectively.

If, for instance, a first bit segment B1 to be initially recorded on the magnetic recording track 35 should represent binary "1", a second pulse signal having the width tD1 and then a first pulse signal having the width tC1 are applied to the second and first ports P2 and P1 of the magnetic head driver 10, respectively. And if a second bit segment B2 to be recorded next should represent binary "0", the pulse widths tD0 and tC0 are selected for recording the second bit B2.

Thereafter, the microcomputer 30 confirms that the bit recording number n1=0, and so the first bit segment B1 is about to be recorded. The microcomputer 30 sets the first port P1 to a high level H and, concurrently, sets the second port P2 to a low level L for a time period tA prior to the actual recording of the first bit segment B1. According to the present embodiment, the time period tA is determined according to the pulse width tD of the second pulse signal applied to the first port P1 for recording the first bit segment B1. In the example shown in FIG. 2, the time period tA is, therefore, equal to the pulse width tD1.

In this way, a reversed magnetic zone is prerecorded immediately before a forward magnetic zone of the first bit segment B1, as is shown in FIG. 2. In result, an analog signal reproduced from the magnetic pattern on the magnetic recording track 35 will have a wave form as shown in FIG. 2, wherein a positive peak is generated at a leading end of the prerecorded reversed magnetic zone. This positive peak is not regarded as a data signal, and is easy to eliminate as a noise signal because no clock signal is generated before, and the amplitude of the positive peak is too small compared with normal data signals. After the positive peak, an initial clock signal is generated upon transferring from the prerecorded reversed magnetic zone to the forward magnetic zone of the first bit segment, that is, in response to an inversion of magnetizing direction. Accordingly, the initial clock signal in the reproduced signal has a sufficiently distinctive amplitude that is larger than a threshold value K, as is shown in FIG. 2, thereby ensuring reliable decoding of the binary code data.

Following the prerecording, the second pulse signal of the determined pulse width, i.e. tD1 in this instance, is applied to the second port P2, thereby recording the forward magnetic zone of the first bit segment B1. Immediately thereafter, the first pulse signal of the determined pulse width, i.e. tC1 in this instance, is applied to the first port P1, thereby recording the reversed magnetic zone of the first bit segment B1. After the first bit segment B1 is thus recorded, the bit recording number n1 is incremented by one, and the incremented bit recording number n1 is compared with a constant r.

The constant r is provided as a reference for determining whether the bit recording interval TT should be revised or not. For example, when the constant r=8, the encoder pulse spacing T is measured again after recording every eighth bit, so as to revise the bit recording interval TT if necessary. In this way, even when the advance speed of the filmstrip F should fluctuate due to slipping of the roller 46a on the filmstrip F, for example, the bit recording interval TT is adjusted sooner to maintain the bit segments B1 to Bn in the constant length.

Thereafter, the second bit of the recording data is read out from the RAM 44, and the second bit segment B2 is recorded in the same sequence as the first bit segment, except that no prerecording is executed. Since the second bit is "0" in the example of FIG. 2, a second pulse signal having the width tD0 and then a first pulse signal having the width tC0 are sequentially applied to the second and first ports P2 and P1, respectively. The third and following bits of the recording data are recorded in the same way as for the second bit.

When it is determined that the last bit of the recording data has been recorded as the last bit segment Bn, an rerecording process is executed, wherein the microcomputer 30 sets the first port P1 to the low level L and the second port P2 to the high level H for a time period tZ, thereby recording a forward magnetic zone immediately behind the reverse magnetic zone of the last bit segment Bn. Thereafter, both the first and second ports P1 and P2 are set to the high level for the same time period tZ. Similarly to the time period tA for the prerecording, the time period tZ for the rerecording is determined to correspond to the pulse width tD of the second pulse signal applied for recording the last bit segment Bn.

When the first and second ports P1 and P2 are simultaneously set to the high level H, control transistors 17 and 18 are set conductive to make all switching transistors 13 to 16 conductive. Thereby, both terminals of the magnetic head 12 are short-circuited, so that scarcely any current flow through a coil 12a. As the bridge circuit including the magnetic head 12 is grounded at that time, electric charge accumulated around the magnetic head 12 is discharged from the bridge circuit in a moment. Therefore, unstable extraneous current will not flow through the coil 12a. Because resistances 25 and 26 function as protection resistances, the bridge circuit is protected from an extremely large current flow.

Figure 10:
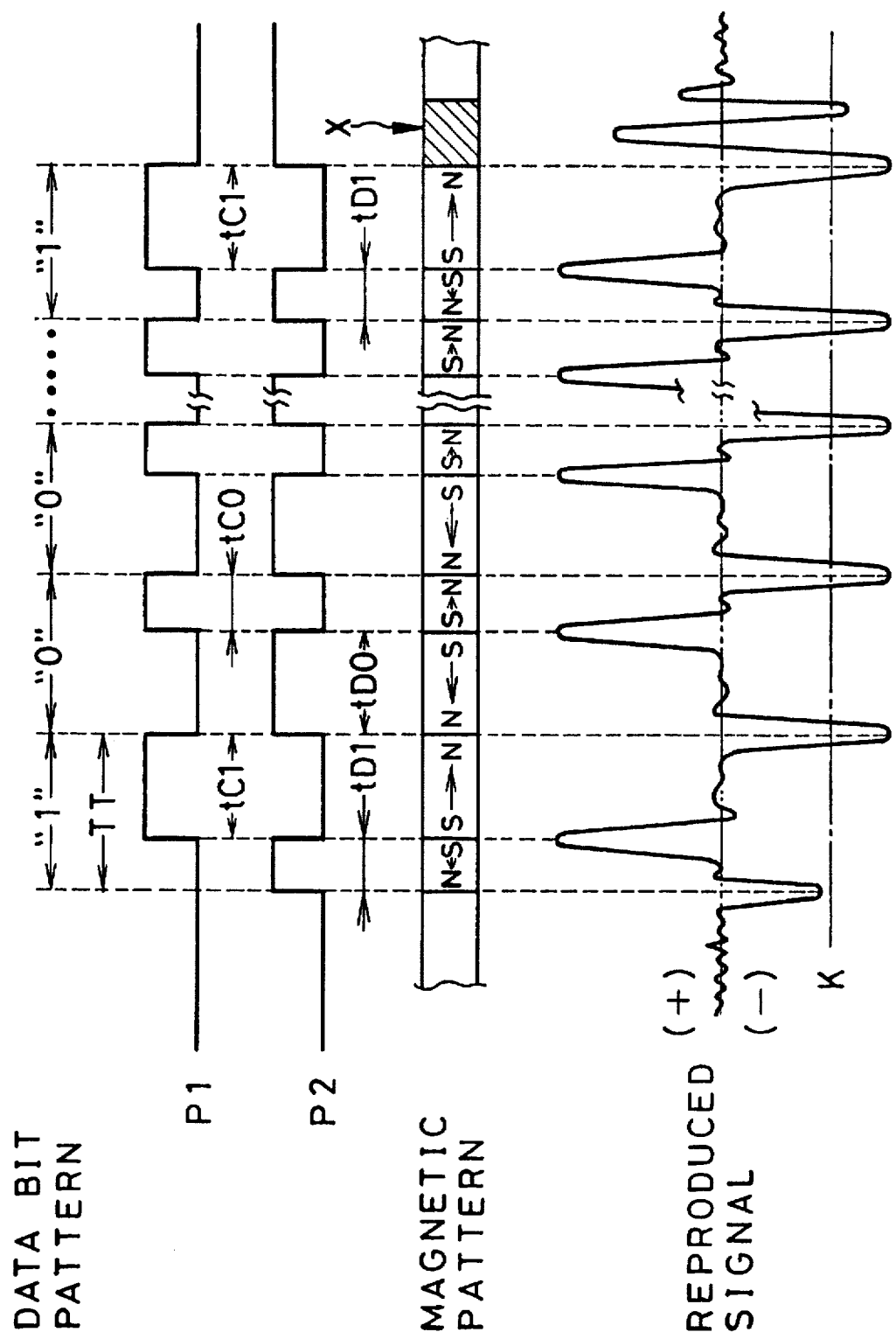
FIG. 10 is a timing chart illustrating a magnetic recording according to another conventional method.

Because the forward magnetic zone is rerecorded immediately behind the reverse magnetic zone of the last bit segment Bn, an extraneous magnetic zone X as shown in FIG. 10 is not recorded behind the last bit segment Bn. Moreover, because the magnetic head 12 is short-circuited after the rerecording, the current IH through the magnetic head 12 is rapidly reduced to zero, so that, in the reproduced signal, only a positive peak or pulse with a small amplitude is generated at a trailing end of the rerecorded forward magnetic zone after a final or last clock signal. Also the last positive peak can be eliminated as a noise because no clock signal or negative peak is generated thereafter.

After the rerecording and short-circuiting, the first and second ports P1 and P2 are set to the low level L, completing the magnetic recording sequence. Thereafter when it is determined based on the perforation signal PF from the perforation signal generator 38 that the filmstrip F has been advanced by one frame, the motor 29 is stopped to position the next frame for the next exposure.

The total number of bits of the recording data to be recorded during the one-frame advancing is determined to be recordable within the magnetic recording track 35 allocated to one frame. Therefore, in the normal operation, the filmstrip F could not be advanced one frame until the recording data of one frame has been recorded. In order to cope with a case where the filmstrip F has been advanced one frame before the magnetic recording has been completed, that might be caused by a noise or error, the magnetic recording sequence includes a step of interrupting driving the magnetic head 12 and the motor 29. After the interruption, it is preferable to rotate the motor 29 reversely to move the filmstrip F back to the recording start position where the magnetic head 12 faces the leading end of the magnetic recording track 35, and then start magnetic recording from the first bit of the recording data, while reading the recording data again from the RAM 44.

Figure 4:
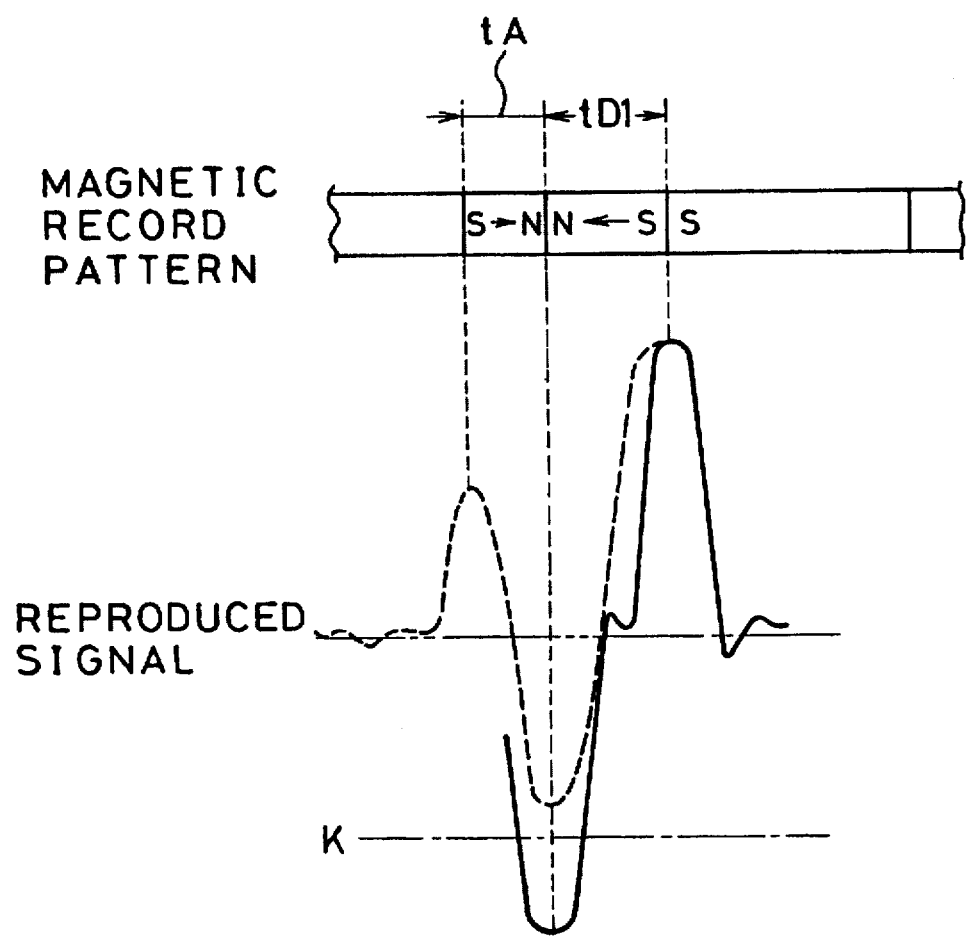
FIG. 4 is a diagram illustrating the pre-magnetization according to the present invention.

As set forth above, a long time period for the prerecording or rerecording is disadvantageous in view of power consumption. However if the time period tA is less than the smaller pulse width tD1 of the second pulse signal that is applied for the binary "1" in the present embodiment, the positive peak generated responsive to a leading end of the prerecorded reversed magnetic zone would not be spaced sufficiently away from the first data signal of the reproduced signal. Then, the reproduced signal tends to turn to the rising direction too soon to allow the first clock signal to reach the threshold value K, as is shown in dashed lines in FIG. 4. In view of this, the time period tA should not be less than the smaller pulse width tD1 of the second pulse signal, or the pulse width tC0 of the first pulse signal for the binary "0". It is to be noted that so long as the bit recording interval TT is unchanged, the pulse width tC1 is equal to the pulse width tD0, and the pulse width tC0 is equal the pulse width tD1.

In other words, the time period tA may be equal to either a smaller or a larger one of the pulse widths of the data and first pulse signals that are determined be used for recording the first bit segment B1. That is, the time period tA may be determined in correspondence with the pulse width tC of the first pulse signal applied for the first bit segment B1. For the same reason as for the time period tA, it is possible to determine the time period tZ in correspondence with the pulse width tC of the first pulse signal for the last bit segment Bn.

Furthermore, the time period tA or tZ is not necessarily equal to the pulse width tD or tC of the second pulse signal or the first pulse signal. It is possible to predetermine a constant time period tM for the time period tA and tZ, wherein tD1<tM<tD0.

Figure 5:
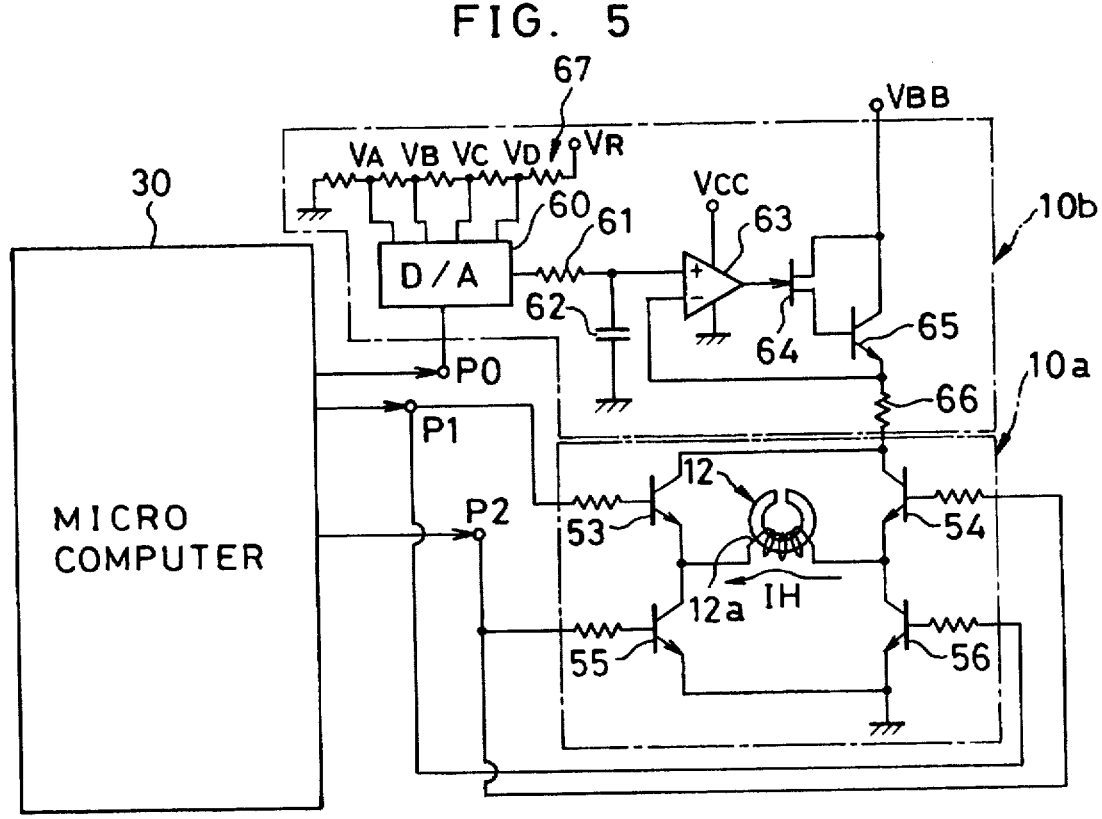
FIG. 5 is a circuit diagram showing a magnetic head driver according to another embodiment of the invention.

FIG. 5 shows a magnetic head driver of a magnetic recording device according to another embodiment of the present invention. The second embodiment may have the same construction as shown in FIG. 1, except but the magnetic head driver is constituted of a drive control section 10a and a current control section 10b. Therefore, detailed description of the same elements as used in the first embodiment will be omitted.

The drive control section 10a is constituted of a magnetic head 12 and switching transistors 53, 54, 55 and 56 connected as a bridge circuit. The bases of the switching transistors 53 and 56 are connected to a first port P1, and the bases of the switching transistors 54 and 55 are connected to a second port P2, such that current IH flows through a coil 12a of the magnetic head 12 in a forward direction upon a second pulse signal being applied to the second port P2 while the first port P1 is set to a low level, i.e., no first pulse signal is applied to the first port P1. The direction of the current IH is reversed when the first pulse signal is applied to the first port P1 while the second port P2 is set to the low level.

The current control section 10b is connected between a power source with a supply voltage VBB and the drive control section 10a. The current control section 10b is constituted of a D/A convertor 60, an integrating circuit consisting of a resistance 61 and a capacitor 62, an operational amplifier 63, an FET 64 and a transistor 65 connected in cascade to an output of the operational amplifier 63, and a reference resistor 66. An input of the D/A converter 60 is connected to a microcomputer 30 through a third port P0. Four different control voltages VA, VB, VC and VD (VA<VB<VC<VD) may be tapped into the D/A converter 50 from a voltage divider 67, which is connected to a reference voltage VR and consists of five resistors. The D/A converter 60 outputs one of the four reference voltages VA to VD in response to a current control signal inputted in the third port P0.

The operational amplifier 63 receives at its non-inverting input a terminal voltage of the capacitor 62 of the integrating circuit. The capacitor 62 is charged up to the control voltage from the D/A converter 60, but gradually through the resistor 61, so that also the control voltage at the non-inverting input of the operational amplifier 63 increases gradually.

The non-inverting input of the operational amplifier 63 is connected to the emitter of the transistor 65, so that the potential at a connecting point between the emitter and the reference resistor 66 is adjusted to a voltage level at the non-inverting input of the operational amplifier 63. Accordingly, current flowing through the reference resistor 66 changes proportionally to the control voltage applied to the non-inverting input of the operational amplifier 63.

The operation of the magnetic recording device of the second embodiment will be described with reference to FIG. 6, 7A, 7B and 7C.

Responsive to an exposure end signal, the microcomputer 30 resets both recorded bit number n1 and encode pulse number n2 to zero, and then outputs a drive signal to a motor driver 31 to start advancing a filmstrip F.

Thereafter, the microcomputer 30 refers to a data ROM 42 to convert photographic information about the exposed frame such as a shutter speed, an aperture value and a subject distance into binary code data, and write it as recording data in a predetermined address of a RAM 44. From the start of film advance, the microcomputer counts up encode pulses ENC of an encode pulse generator 47, and compares the number n2 of the encode pulses with a constant value nA. When the number n2 reaches the constant value nA, the microcomputer 30 set the first port P1 to a high level H, and the second port P2 to a low level L. Simultaneously, the microcomputer 30 inputs the current control signal to the port P0 of the current control section 10b, so as to cause the D/A converter 60 to output the lowest control voltage VA. Thus, prerecording is started with the lowest voltage VA before the magnetic recording track 35 is moved to the magnetic head 12.

Specifically, as the capacitor 62 is charged with the control voltage VA from the D/A converter 60, the gradually increasing terminal voltage of the capacitor 62 is applied to the non-inverting input of the operational amplifier 63. While the first port P1 is in the high level H, the switching transistors 13 and 16 are turned ON, so that the current IH flows through the coil 12a in the reversed direction to the forward direction shown by an arrow in FIG. 5. The operational amplifier 63 controls through the FET 64 and the transistor 65 the magnitude of the current flowing through the reference resistor 66 in correspondence with the voltage level at the non-inverting input of the operational amplifier 63. Because the current through the reference resistor 66 is identical with the current IH through the coil 12a, the magnitude of the current IH increases proportionally to the voltage at the non-inverting input of the operational amplifier 63.

During the prerecording, the filmstrip F continues to be advanced. A constant q is predetermined such that the number n2 of the encoder pulses ENC reaches nA+q before the voltage to the non-inverting input of the operational amplifier 63 reaches the control voltage VA. When the number n2 reaches nA+q, the microcomputer 30 inputs the next current control signal to the port P0 of the current control section 10b. Then, the D/A converter 60 outputs the second lowest control voltage VB, so that the terminal voltage of the capacitor 52 goes above the control voltage VA, and thus the current IH increases correspondingly.

In the same way, the D/A converter 60 outputs the higher voltage VC when the number n2 reaches a predetermined value nA+2q, and thereafter outputs the highest voltage VD when the number n2 reaches a predetermined value nA+3q. In result, the current IH gradually increases from the time when the number n2 of the encoder pulses ENC reaches the constant value nA after the start of film advancing. The degree of increase of the current IH is thus controlled according to the advance speed of the filmstrip F. After the terminal voltage of the capacitor 62 reaches the control voltage VD, the current IH maintains a constant level. As the increasing current IH is flowing through the coil 12 in the reversed direction, a reversed magnetic zone with gradually increasing magnetic density is recorded on the magnetic recording layer before the magnetic recording track 35.

When the advanced length of the filmstrip F reaches the value corresponding to the number n2=nA+3q, the microcomputer 30 derives an encoder pulse spacing T between the latest encoder pulse and the preceding encoder pulse. The encoder pulse spacing T principally corresponds to a unit length of the filmstrip F, so a bit recording interval TT is calculated according to the equation $TT=T/\alpha$, in the same way as in the first embodiment.

Thereafter, the recording data is serially read from the RAM 44. Each bit of the recording data is checked as to whether it is binary "1" or "0". Depending upon the binary value, respective pulse widths tD and tC of the second pulse signal and the first pulse signal to be inputted in the first port P1 and the second port P2 are determined for each bit, in the same way as in the first embodiment.

After this process, the microcomputer 30 determines based on the counted number n2 of the encode pulses so far, whether a recording start position, e.g., a leading end of the recording track 35, of the filmstrip F moves to the magnetic head 12. The microcomputer 30 stands-by unless the recording start position moves to the magnetic read 12, while counting the number n2 of the encode pulses ENC after confirming that the number n1 of recorded bit is zero. During the standby condition, the prerecording of the reversed magnetic zone is continued with the current IH of the constant level. When the recording start position reaches the magnetic head 12, the microcomputer 30 starts outputting the second pulse signal with the width tD1 or tD0 and the first pulse signal with the pulse width tC1 or tC0 depending upon the binary value of each bit.

Figure 6:
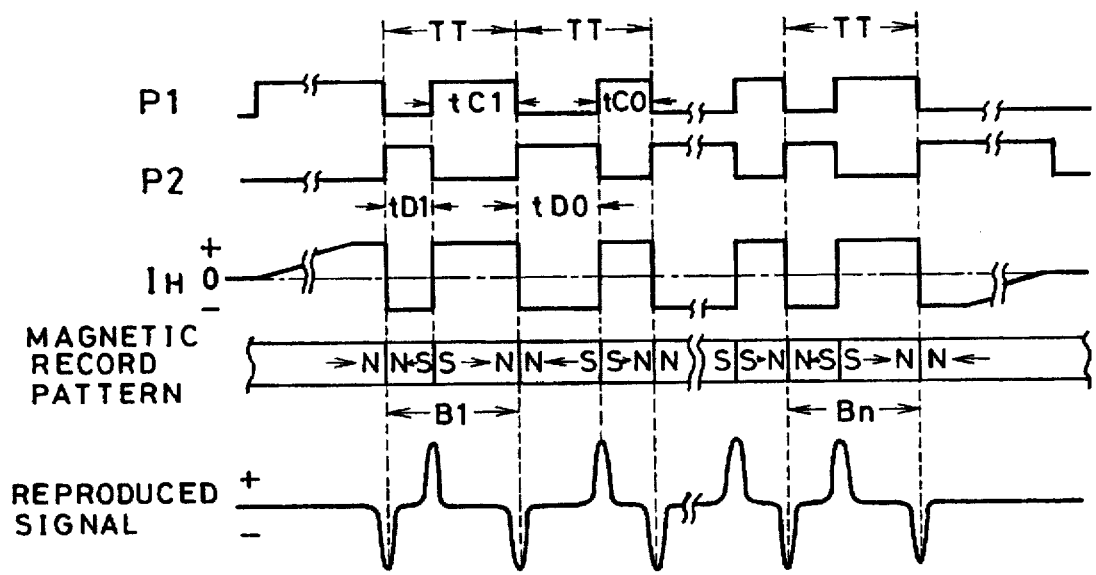
FIG. 6 is a timing chart illustrating the operation of the magnetic recording device having the magnetic head driver shown in FIG. 5.
Figure 7A:
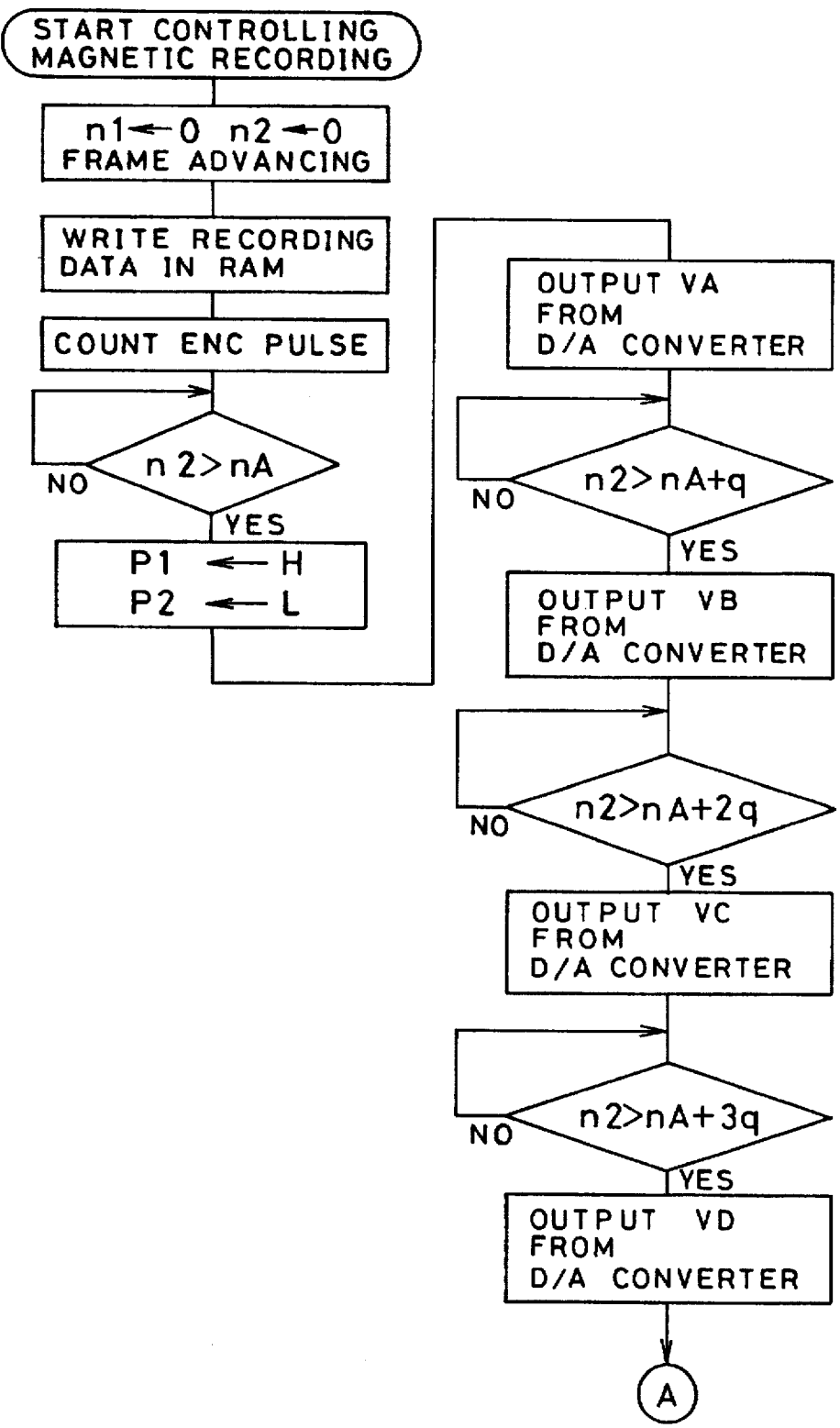
FIGS. 7A, 7B and 7C illustrate a flow chart illustrating the operation of the microcomputer of the magnetic recording device of the second embodiment.
Figure 7B:
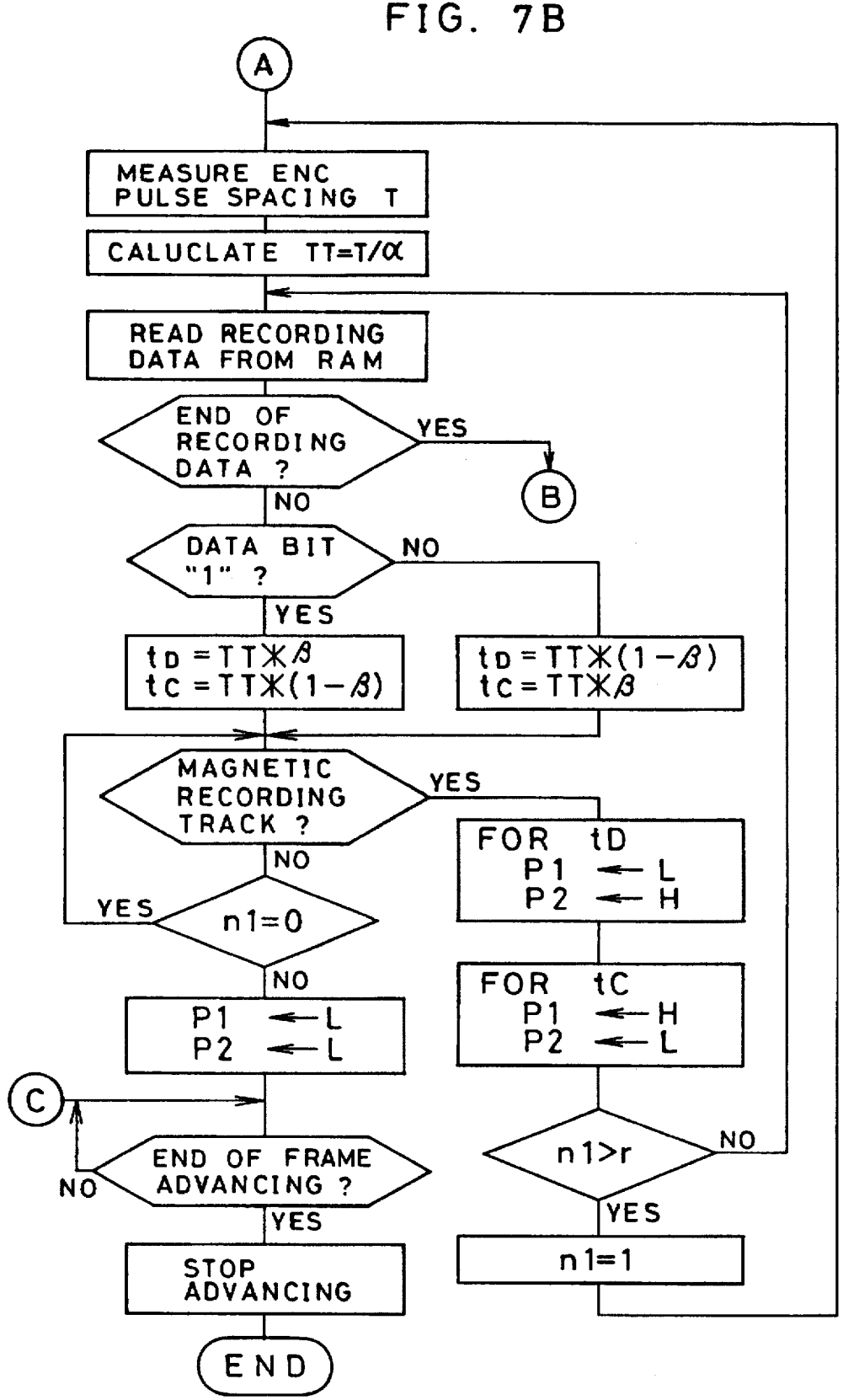
Figure 7C:
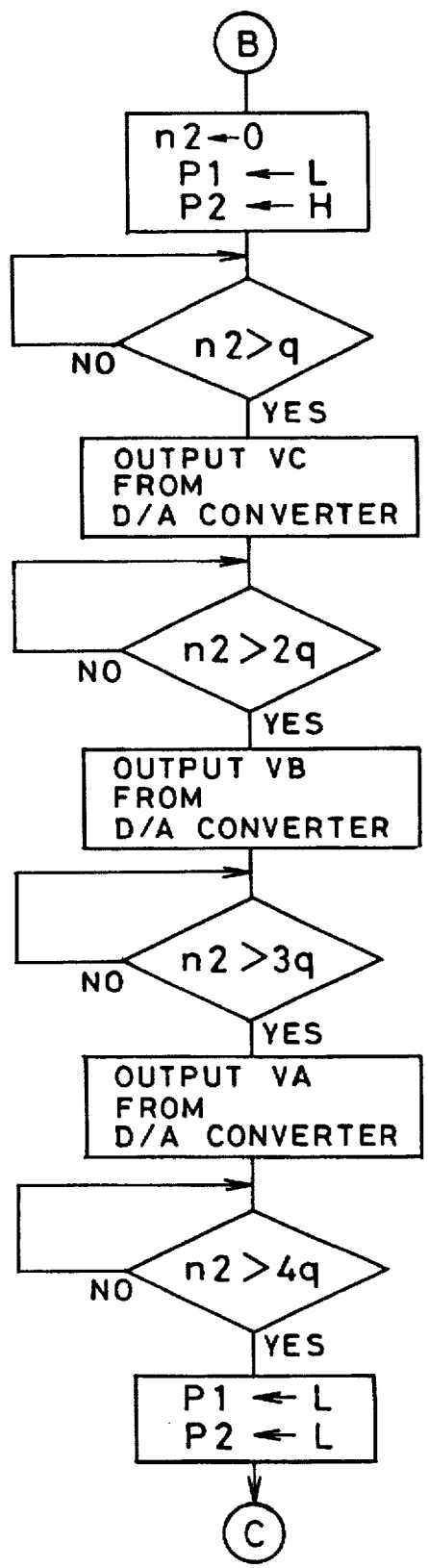

In the same way as in the first embodiment, independently of the binary value, first the second pulse signal and then the first pulse signal are outputted for recording each bit segment, so that each bit segment is constituted of a forward magnetic zone and a succeeding reversed magnetic zone. Since the reversed magnetic zone has been prerecorded immediately before the forward magnetic zone of the start or first bit segment, an initial clock signal reproduced at the recording start position of the binary code data on the magnetic recording track 35 will have a sufficient amplitude for reliable decoding, as shown in FIG. 6.

The recorded bit number n1 is incremented one by one after recording each bit segment, and the incremented number n1 is compared with a constant r which is predetermined as an interval for revising the recording interval TT in accordance with the advance speed of the filmstrip F, in the same way as for the first embodiment. During recording the binary code data, the capacitor 62 is maintained charged up to the highest control voltage VD from the D/A converter 50, so that the current IH is maintained constant for magnetic recording in both directions.

After the end or last bit segment is recorded, the counted number n2 of the encode pulses ENC is reset to zero, and the first port P1 is set to the low level L, and the second port P2 is set to the high level H. As a result, the direction of the current IH is changed to the forward direction. Since the terminal voltage of the capacitor 62 at the end of the data recording is equal to the highest control voltage VD, a forward magnetic zone is rerecorded behind the reversed magnetic zone of the end bit segment, with the current IH having the constant level.

When the counted number n2 of the encode pulses ENC reaches the constant value q after being reset to zero at the end of data recording, i.e., after the start of the rerecording, the microcomputer 30 outputs a current control signal to cause the D/A converter 60 to output the lower control voltage VC. In response to the change of the control voltage from VD to VC, the capacitor 62 starts discharging, so that the voltage at the non-inverting input of the operational amplifier 63 and the current IH start decreasing gradually. Accordingly, the magnetic density decreases in the rerecorded forward magnetic zone.

Thereafter, when the number n2 reaches 2q, the D/A converter 60 outputs the control voltage VB, and when the number n2 reaches 3q, the D/A converter 60 outputs the control voltage VA. As a result, the current IH gradually decreases to zero till the ports P1 and P2 are set to the low level L when the number n2 reaches 4q, to terminate the rerecording of the forward magnetic zone. In this way, also the degree of decrease of the current IH is controlled according to the advance speed of the filmstrip F. Thereafter when a perforation signal detector 38 detects a perforation 39a formed beside a leading end of the next frame 40 to be exposed, a motor 29 is stopped.

The total number of bits of the recording data to be recorded during the one-frame advancing is determined to be recordable within the magnetic recording track 35 allocated to one frame. Therefore, in the normal operation, the filmstrip F could not be advanced one frame until the recording data of one frame has been recorded. In order to cope with a case where the filmstrip F has been advanced one frame before the magnetic recording has been completed, if it is determined that the magnetic head 12 is out of the magnetic recording track 35 while the recorded bit number n1 is not zero, both the first and second ports P1 and P2 are urgently set to the low level to interrupt driving the magnetic head 12 and the motor 29. After the interruption, it is preferable to rotate the motor 29 reversely to move the filmstrip F back to the recording start position, and then start magnetic recording from the start bit of the recording data again.

In this way, the forward magnetic zone is rerecorded behind the reversed magnetic zone of the end bit segment, a final clock signal reproduced at the trailing end of the binary code data recorded on the magnetic recording track 35 will have a sufficient amplitude for reliable decoding, as shown in FIG. 6. Rerecording prevents unexpected recording due to the vibrating current. Moreover, because the prerecording and the rerecording are executed with gradually increasing and decreasing current IH, respectively, the reproduced signal will not have any extraneous peaks that would otherwise be produced at the leading end of the prerecorded magnetic zone and the trailing end of the rerecording magnetic zone. The second embodiment is also useful for reducing power consumption.

Since the timing of prerecording and rerecording is determined with reference to the number n2 of the encode pulses in the second embodiment, the lengths of the lengths of the prerecorded and rerecorded zone are certainly longer than the bit segment recorded in the bit recording interval TT. But it is possible to determine the length of the prerecording zone or the rerecording zone as short as the bit segment. For this modification, timing pulses having a sufficiently shorter spacing than, e.g., a small fraction of, the bit recording interval TT may be generated for determining the timing of the application of the respective control voltages VA to VD.

The present invention is applicable not only to a magnetic recording device of a camera, but also to a magnetic recording device for recording print order data or the like on a magnetic recording layer of developed photo film.

Thus, the present invention should not be limited to the above-described embodiments but, on the contrary, various modifications can be possible to those skilled in the art without departing from the scope and spirit of the appended claims.

What is claimed is:

1. A magnetic recording method for recording binary bits on a magnetic recording track of photo film while moving said photo film in a direction, said method comprising the steps of:

A. recording a first kind of magnetic zone magnetized in a first direction for a first or a second time period which is selected depending upon binary value of each bit of said binary bits;

B. recording a second kind of magnetic zone magnetized in reverse to said first direction behind said first kind of magnetic zone for a time period given by subtracting said first or said second time period from a bit recording interval predetermined for recording one bit;

C. repeating steps A and B from a first bit to a last bit of said binary bits, such that each bit of said binary bits is recorded as a bit segment of a constant length constituted of said first kind of magnetic zone magnetized in said first direction and said second kind of magnetic zone magnetized in a direction reverse to said first direction and disposed behind said first kind of magnetic zone within said bit segment; and D. recording an additional magnetic zone of said second kind for a third time period determined based on said first or said second time period, immediately before recording said first bit of said binary bits.

2. A magnetic recording method according to claim 1, wherein said additional magnetic zone does not constitute a bit or a portion of a bit.

3. A magnetic recording method according to claim 1, wherein said third time period of said additional magnetic zone is equal to a time period of the first kind of magnetic zone of the first bit of said binary bits.

4. A magnetic recording method for recording binary bits on a magnetic recording track of photo film while moving said photo film in a direction, said method comprising the steps of:

A. recording a first kind of magnetic zone magnetized in a first direction for a first or a second time period which is selected depending upon binary value of each bit of said binary bits;

B. recording a second kind of magnetic zone magnetized in reverse to said first direction behind said first kind of magnetic zone for a time period given by subtracting said first or said second time period from a bit recording interval predetermined for recording one bit;

C. repeating steps A and B from a first bit to a last bit of said binary bits, such that each bit of said binary bits is recorded as a bit segment of a constant length constituted of said first kind of magnetic zone magnetized in said first direction and said second kind of magnetic zone magnetized in a direction reverse to said first direction and disposed behind said first kind of magnetic zone within said bit segment; and D. recording an additional magnetic zone of said first kind for a third time period determined based on said first or said second time period, after recording said last bit of said binary bits.

5. A magnetic recording method according to claim 4, further comprising the step of:

E. short-circuiting a magnetic head for a fourth time period after step D, to provide a non-magnetized zone behind said first kind of magnetic zone recorded in step D, said fourth time period being determined based on said first or said second time period.

6. A magnetic recording method according to claim 5, wherein, in steps D and E, said third and fourth time periods are respectively determined to be equal to one of said first and second time periods which is selected for recording said last bit of said binary bits.

7. A magnetic recording method according to claim 5, further comprising the step of:

F. recording an additional magnetic zone of said second kind for a fifth time period determined based on said first or said second time period, immediately before recording said first bit of said binary bits.

8. A magnetic recording method according to claim 4, further comprising the step of:

F. recording an additional magnetic zone of said second kind for a fourth time period determined based on said first or said second time period, immediately before recording said first bit of said binary bits.

9. A magnetic recording method according to claim 8, wherein, in step F, said fourth time period is determined to be equal to one of said first and second time periods which is selected for recording said first bit of said binary bits.

10. A magnetic recording method according to claim 4, further comprising the steps of:

E. measuring a moving speed of said photo film at regular intervals; and

F. adjusting said bit recording interval to the moving speed, so as to record each bit in a constant length.

11. A magnetic recording method according to claim 4, wherein said additional magnetic zone does not constitute a bit or a portion of a bit.

12. A magnetic recording method according to claim 4, wherein said third time period of said additional magnetic zone is equal to a time period of the first kind of magnetic zone of the last bit of said binary bits.

13. A magnetic recording method for recording binary bits on a magnetic recording track of photo film while moving said photo film in a direction on a magnetic head, said method comprising the steps of:

A. recording a first kind of magnetic zone magnetized in a first direction by conducting a constant current in a forward direction through said magnetic head for a first or a second time period which is selected depending upon binary value of each bit of said binary bits;

B. recording a second kind of magnetic zone magnetized in reverse to said first direction behind said first kind magnetic zone by conducting the constant current in a reversed direction through said magnetic head for a time period given by subtracting said first or said second time period from a bit recording interval predetermined for recording one bit;

C. repeating steps A and B from a first bit to a last bit of said binary bits, such that each bit of said binary bits is recorded as a bit sediment of a constant length constituted of said first kind of magnetic zone magnetized in said first direction and second kind of magnetic zone magnetized in a direction reverse to said first direction and disposed behind said first kind of magnetic zone within said bit segment; and D. recording an additional magnetic zone of said second kind immediately before said first bit of said binary bits, by conducting a gradually increasing current through said magnetic head in said reversed direction.

14. A magnetic recording method according to claim 13, wherein said additional magnetic zone does not constitute a bit or a portion of a bit.

15. A magnetic recording method for recording binary bits on a magnetic recording track of photo film in a serial fashion while moving said photo film in a direction on a magnetic head, said method comprising the steps of:

A. recording a first kind of magnetic zone magnetized in a first direction by conducting a constant current in a forward direction through said magnetic head for a first or a second time period which is selected depending upon binary value of each bit of said binary bits;

B. recording a second kind of magnetic zone magnetized in reverse to said first direction behind said first kind magnetic zone by conducting the constant current in a reversed direction through said magnetic head for a time period given by subtracting said first or said second time period from a bit recording interval predetermined for recording one bit;

C. repeating steps A and B from a first bit to last bit of said binary bits, such that each bit of said binary bits is recorded as a bit segment of a constant length constituted of said first kind of magnetic zone magnetized in said first direction and said second kind of magnetic zone magnetized in a direction reverse to said first direction and disposed behind said first kind of magnetic zone within said bit segment; and D. recording an additional magnetic zone of said first kind immediately behind said last bit of said binary bits, by conducting a gradually decreasing current through said magnetic head in said forward direction.

16. A magnetic recording method according to claim 15, further comprising the step of:

E. recording an additional magnetic zone of said second kind immediately before said first bit of said binary bits, by conducting a gradually increasing current through said magnetic head in said reversed direction.

17. A magnetic recording method according to claim 16, further comprising the steps of:

F. measuring a moving speed of said photo film at regular intervals; and

G. controlling the rate of increase and decrease of the current through said magnetic head in accordance with an increase and decrease in the moving speed of said photo film.

18. A magnetic recording method according to claim 15, wherein said additional magnetic zone does not constitute a bit or a portion of a bit.

19. A magnetic recording device for recording binary bits on a magnetic recording track of photo film while moving said photo film in a direction on a magnetic head, wherein each bit of said binary bits is recorded as a bit segment of a constant length constituted of a first kind of magnetic zone magnetized in a first direction and a second kind of magnetic zone magnetized in a direction reverse to said first direction and disposed behind said first kind of magnetic zone within said bit segment, said first kind of magnetic zone having one of two different lengths within each bit segment depending upon a binary value assigned to said bit segment, said device comprising: a bridge circuit comprising first and second switching transistors connected in parallel to each other and to a power source, third and fourth switching transistors respectively connected in series to said first and second switching transistors, and a magnetic head connected at one terminal to a connecting point between said first and third switching transistors, and at another terminal to a connecting point between said second and fourth switching transistors;

a first port connected to bases of said first and fourth switching transistors;

a second port connected to bases of said second and third switching transistors; and a control device for outputting switching signals to said first port and said second port in an alternating fashion so as to switch over the direction of current flowing through said magnetic head in accordance with said binary bits, said first kind of magnetic zone being recorded while a switching signal is applied only to said second port, said second kind of magnetic zone being recorded while a switching signal is applied only to said first port, the improvement comprising:

said control device which outputs a switching signal to said first port for a time period immediately before recording said binary bits to cause said magnetic head to record an additional magnetic zone of said second kind immediately before recording a first bit of said binary bits, said time period being determined based on one of said two different lengths of said first kind of magnetic zone.

20. A magnetic recording device according to claim 19, wherein said control device outputs a switching signal to said second port for a time period immediately after recording said binary bits so that an additional magnetic zone of said first kind is recorded immediately after recording a last bit of said binary bits, said time period being determined based on one of said two different lengths of said first kind of magnetic zone.

21. A magnetic recording device according to claim 20, wherein said control device outputs switching signals to both of said first and second ports to turn all of said switching transistors ON to short-circuit said magnetic head, immediately after said first kind of magnetic zone being recorded behind said binary bits.

22. A magnetic recording device according to claim 21, further comprising a device for measuring a moving speed of said photo film and outputting a signal representative of the moving speed of said photo film to said control device, so that said control device controls a time interval for recording one bit segment in accordance with the moving speed.

23. A magnetic recording device according to claim 19, wherein said additional magnetic zone does not constitute a bit or a portion of a bit.

24. A magnetic recording device according to claim 19, wherein said time period of said additional magnetic zone is equal to a time period of the first kind of magnetic zone of the first bit of said binary bits.

25. A magnetic recording device for recording binary bits on a magnetic recording track of photo film while moving said photo film in a direction on a magnetic head, wherein each bit of said binary bits is recorded as a bit segment of a constant length constituted of a first kind of magnetic zone magnetized in a first direction and a second kind of magnetic zone magnetized in reverse to said first direction and disposed behind said first kind of magnetic zone within said bit segment, said first kind of magnetic zone having one of two different lengths within each bit segment depending upon a binary value assigned to said bit segment, said device comprising:

a bridge circuit comprising first and second switching transistors connected in parallel to each other and to a power source, third and fourth switching transistors respectively connected in series to said first and second switching transistors, and a magnetic head connected at one terminal to a connecting point between said first and third switching transistors, and at another terminal to a connecting point between said second and fourth switching transistors;

a first port connected to bases of said first and fourth switching transistors;

a second port connected to bases of said second and third switching transistors; and a control device for outputting switching signals to said first port and said second port in an alternating fashion so as to switch over the direction of current flowing through said magnetic head in accordance with said binary bits, said first kind of magnetic zone being recorded while a switching signal is applied only to said second port, said second kind of magnetic zone being recorded while a switching signal is applied only to said first port, the improvement comprising:

a current control device connected between said power source and said bridge circuit for supplying said magnetic head with a current of a constant value during recording said binary bits, and a current gradually increasing from zero to said constant value immediately before recording said binary bits, and wherein said control device outputs a switching signal to said first port immediately before recording said binary bits, to cause said magnetic head to record an additional magnetic zone of said second kind with said gradually increasing current immediately before recording a first bit of said binary bits.

26. A magnetic recording device according to claim 25, wherein said current control device supplies a current gradually decreasing from said constant value to zero while said control device outputs a switching signal to said second port immediately after recording said binary bits, to cause said magnetic head to record an additional magnetic zone of said first kind with said gradually decreasing current immediately before recording a last bit of said binary bits.

27. A magnetic recording device according to claim 26, further comprising a device for measuring a moving speed of said photo film and outputting a signal representative of the moving speed of said photo film to said control device, so that said control device controls the rate of current increase and decrease through said magnetic head in accordance with an increase or decrease in the moving speed of said photo film.

28. A magnetic recording device according to claim 25, wherein said additional magnetic zone does not constitute a bit or a portion of a bit.

* * * * *